Oct. 18, 1960
D. J. O'CONNOR
2,956,710
DISPOSABLE SHAKER PACKET
Filed Dec. 17, 1956
2 Sheets-Sheet 1
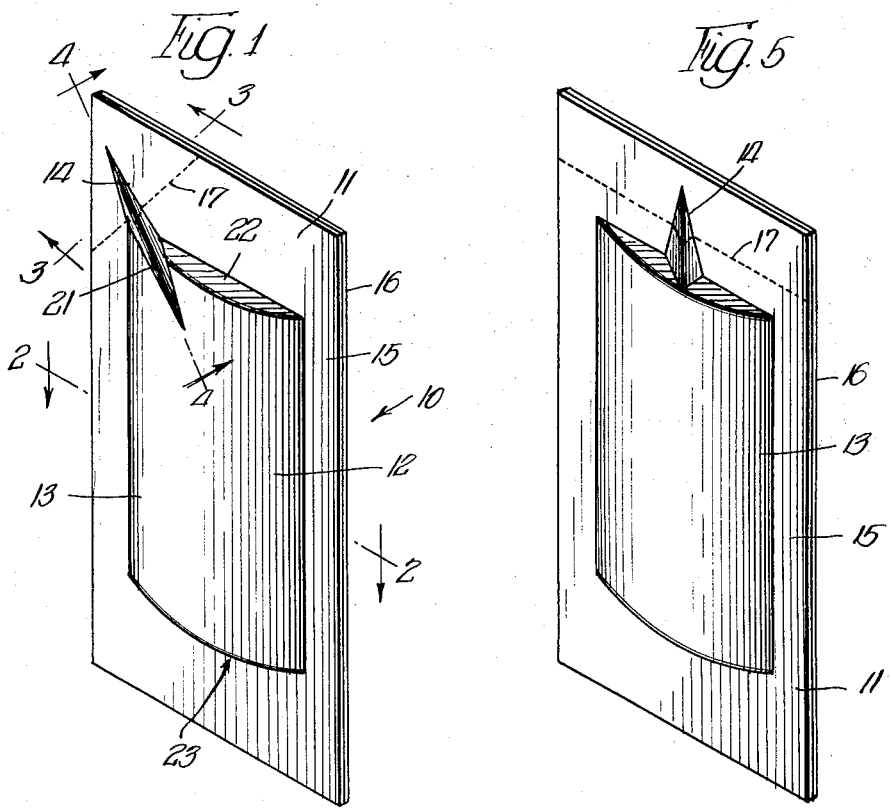
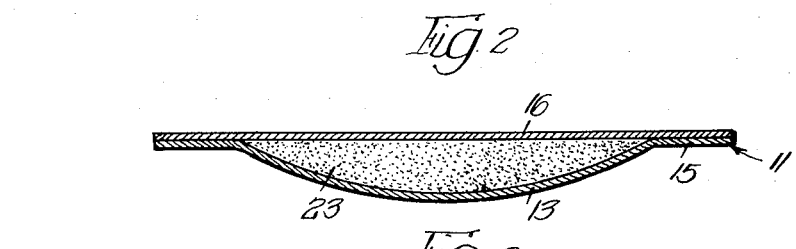
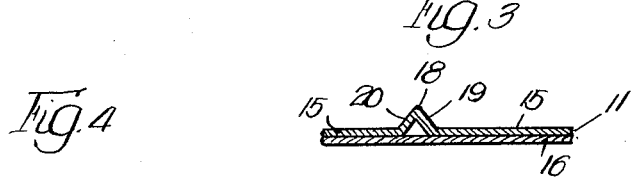
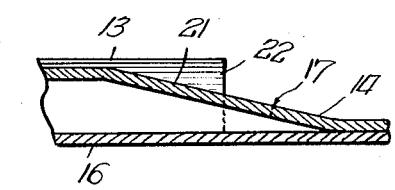
INVENTOR.
Donal J. O'Connor,
BY
Brown, Jackson, Boettcher & Dienner Oct. 18, 1960  D. J. O'CONNOR  2,956,710
DISPOSABLE SHAKER PACKET
Filed Dec. 17, 1956  2 Sheets-Sheet 2

INVENTOR.
Donal J. O'Connor,
BY
Brown, Jackson, Boettcher & Dienner

United States Patent Office 2,956,710
Patented Oct. 18, 1960

2,956,710

DISPOSABLE SHAKER PACKET

Donal J. O'Connor, Chicago, Ill., assignor to Morton Salt Company, Chicago, Ill., a corporation of Illinois Filed Dec. 17, 1956, Ser. No. 628,740

9 Claims. (Cl. 222—107)

This invention relates to disposable packages in which individual portions of salt, pepper, other seasonings and a variety of particulate materials may be stored for subsequent dispensing, and method of making the same.

Over the past few years, considerable demand has been created for containers or packets in which an individual portion or requirement of salt, pepper or the like might be stored and which would be convenient to use and so inexpensive that, after use, the container with the unused portion of its contents could be discarded. Such containers have particularly struck the fancy of that portion of the food dispensing industry represented by operators of refreshment stands at amusement parks, outdoor theaters and amusement areas of all kinds, drive-in restaurants, trains and airlines serving pre-assembled meals to their patrons, manufacturers of make-your-own salad kits, manufacturers of cake mixes, pie mixes, etc., and a host of other food suppliers, caterers and the like.

Thus a first and important object of the invention is to provide a packet of this general utility which will be composed of inexpensive materials and so simply constructed that it can be conveniently manufactured and filled in such large numbers as to be produced at a very tiny cost per packet.

Although the broad idea of packets for this purpose is not new in the packaging industry, and a number of packets have been developed and put into commercial practice, for the most part they have, thus far, comprised an envelope of some type which is used by tearing across one corner, or by pulling a tab, to create an opening through which the contents can be discharged. Although this means of packaging may be quite satisfactory when used for the dry ingredients of cake or pie mixes and the like, it is not as satisfactory for storing cinnamon or other materials, which for most satisfactory results should be sprinkled on the top surface of the completed pie, and the opening ordinarily formed by tearing is so large that only with great difficulty is one able to control the flowing out of the contents. The problem is particularly acute when such packets are used to store individual portions of salt or pepper. More often than not, far too much salt will be poured onto the food, to the displeasure and annoyance of the user and, in some cases, rendering the food unfit for consumption. The average individual is accustomed to dispensing salt, pepper and other seasonings by a shaking action, and is not trained to exercise the degree of skill and care required in dispensing from such a torn envelope. A further disadvantage of such envelopes has been the problems involved in effecting high speed packaging of the particulate material in such envelopes.

Thus a further, more specific, but major object of the present invention is to provide packets or the like with means by which controlled dispensing of their contents may be conveniently obtained.

Still another object of the invention is to provide a shaker packet having an orifice through which the contents of the packet can be dispensed only by a shaking action, the orifice being so dimensioned as to prevent normal free flowing of the contents therethrough.

Still another object is to provide a shaker packet with means by which the orifice size may be varied in accordance with the size of the particles stored in the packet. In this respect it is important not only that the orifice be sized to avoid free flowing of the contents during the act of dispensing, but also that it be large enough to prevent clogging.

Still another object of the invention is to provide such packets which can be economically formed and also filled using high speed machinery in a continuous operation whereby astronomically large numbers of the packets can be produced at exceedingly low unit cost.

With these and other objects in mind it is proposed to provide a packet formed from two sheets of flat stock joined together at their margins, one of which is of deformable, preferably transparent, waterproof plastic, having a "blister" or pocket formed therein which is of a size to conveniently store the particulate material and is enclosed by the second or backer sheet, also of waterproof material.

Such a packet can be formed and filled as a continuous operation by feeding the plastic sheet stock over a rotating drum, heating and drawing a central portion thereof to form the receiving pocket, filling the pocket when in horizontal position on the drum, and thereafter bringing it into contact with backer material fed from a second roll, the two sheets being secured by the application of heat and pressure. Thereafter the individual packets may be die-cut from the joined strips.

One of the chief features of the invention is the provision of the storage pocket with a closed end narrow tapering neck or spout entering into the storage body portion of said pocket and which is transversely scored at a controlling distance from said storage body of the pocket so that the packet may be broken by folding back along said scoring to provide an exit opening in said neck through which the particulate material may be discharged. Since the cross-section of the neck portion by reason of its tapered shape is progressively decreasing in a direction away from the storage body, it will be readily seen that by selective location of the scoring, a wide variety of different sizes of exit orifices may be obtained. Thus similarly sized and shaped packets may be used for dispensing either pepper or salt or other sized particulate material by merely relocating the scoring of the neck portion to permit dispensing of the contents, if desired, by means of a shaking action to avoid a free flowing discharge.

Although presumably the spout may be given a conical or other tapered shape, I prefer that it be more nearly pyramidical, since the resultant triangular cross-section not only gives increased strength to the spout to resist crushing as when packaged with a large number of other packets, but also contributes to a cleaner break when the packet is folded back along the scoring line. A snap break is more likely than where the surface of the spout or neck is more rounded.

Likewise, although the storage pockets may be formed to a variety of shapes, they are preferably given the shape of a partial cylinder not only for the convenience such a shape affords in the filling step of the process, but also because of the increased rigidity of the drawn shape it affords against crushing. Where the plastic material containing the storage pocket is formed relatively thin, ribs or other design may be impressed in the material to increase its rigidity.

Many other objects as well as advantages and features of a packet constructed according to the present invention and method of forming the same will be apparent from the more specific description of preferred embodiments of the invention which follow. Furthermore it will be understood that many changes, modifications of the device and steps of the method as thus disclosed may be made without departing from the spirit of the invention and are intended to be included within the scope thereof as defined in the appended claims.

Now referring to the drawings:

Figure 1 is a perspective view of one embodiment of the invention;

Figure 2 is a section taken through the embodiment disclosed in Figure 1 along lines 2—2 and looking in the direction indicated by the arrows;

Figure 3 is a sectional view taken along lines 3—3 in Figure 1 looking in the direction indicated by the arrows;

Figure 4 is a sectional view taken along lines 4—4 in Figure 1 looking in the direction indicated by the arrows;

Figure 5 is a perspective view showing an alternative form the invention may take.

Figure 6:
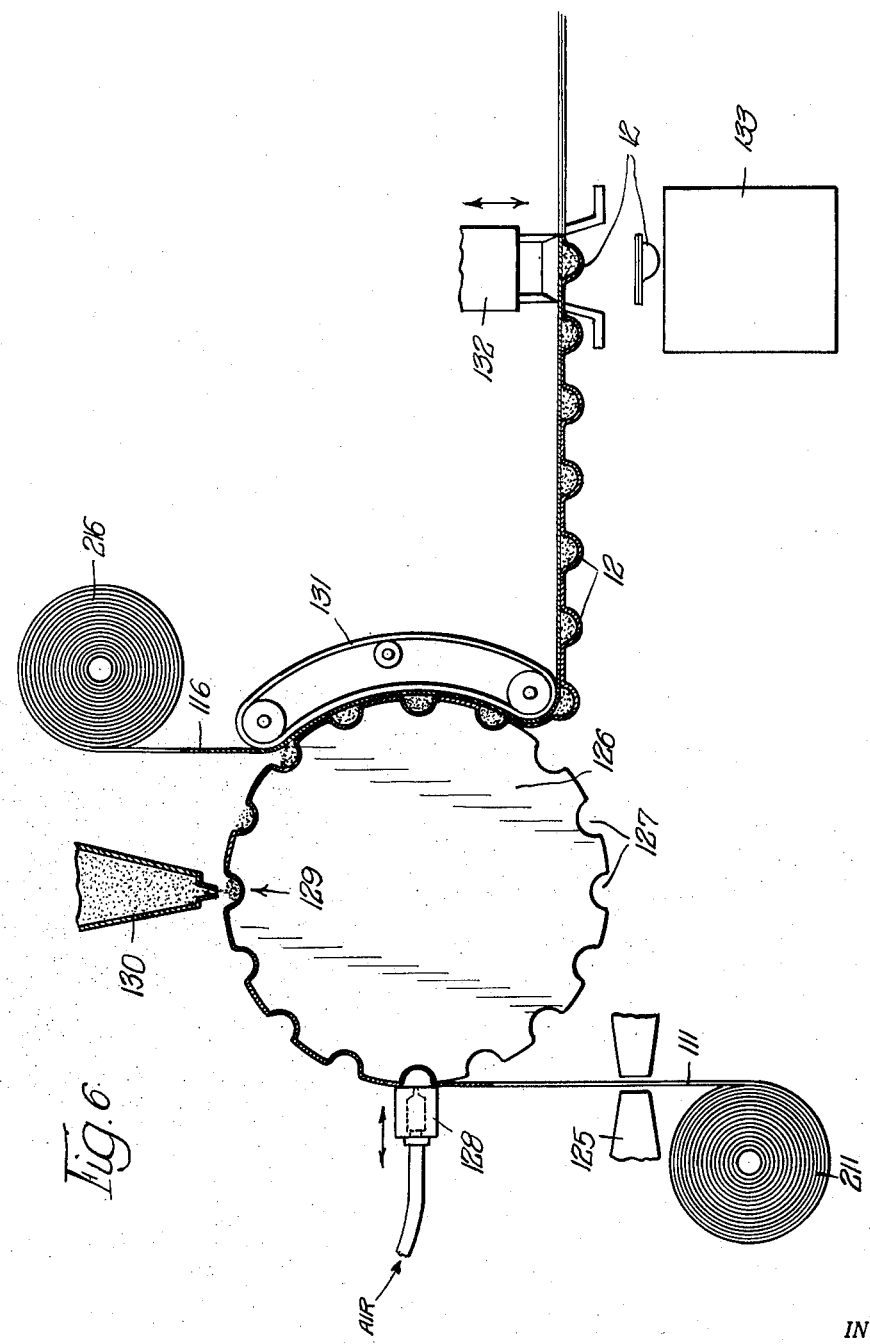
Figure 6 is a view in diagrammatic form of a preferred apparatus for forming packets constructed according to the present invention.

Now referring more particularly to the several views, wherein like parts are identified by like reference numerals, a packet 10 according to the present invention as illustrated in Figure 1 will comprise a first member 11 of heat softenable, thin, substantially water impervious plastic sheet material such as polystyrene, polyvinyl cloride or acetate which has been shaped to have an intermediately disposed depressed area indicated generally at 12 which embodies a cylindrically-shaped storage pocket 13 to receive the contents to be packaged and a tapered neck 14 communicating with said storage pocket 13 through which the contents are dispensed, the surrounding marginal portions 15 of said member 11 about said depressed area 12 being essentially flat. The storage pocket 13 is enclosed by a flat backing member 16 bonded to the rear side of said marginal portions 15 of the first member, thereby sealing in its contents. Said backing member 16 may be of aluminum foil, lacquered paper or other inexpensive waterproof sheet stock. It might also be of the same material as member 11.

In order that the contents may be dispensed through neck portion 14, a line of perforations 17 are impressed in the plastic from edge to edge and extending transversely across the neck 14. Said scoring permits the neck to be broken by folding back the corner of the packet 10 to provide an opening or dispensing orifice.

As seen most clearly when Figures 3 and 4 are considered in conjunction with Figure 1, the spout thus formed by the tapered neck 14 has a triangular shape in section (Fig. 3) which progressively decreases in size in a direction away from the storage pocket 13 (Fig. 4) so that it possesses a generally pyramidal shape in outward appearance. Although its ridge 18 and angularly related sides 19 and 20 which give it the pyramidal appearance could be replaced by a more rounded surface so that it would have a more nearly conical shape, the illustrated pyramidal shape is to be preferred. First it gives greater strength and shape retention to the spout so that it is not as easily crushed and deformed with resultant obstruction of the opening therethrough. However, more importantly it contributes to a clean snap break along the scoring 17 and avoids the possibility of the tear going "wild," and thereby enlarging the size of the opening beyond that desired.

Although preferably the tapered neck 14 or spout will be directed toward one corner of the pocket as illustrated in Figure 1 because of the greater convenience it affords in bending back the portion of the pocket along scoring line 17 to provide an exit for the contents stored in pocket 13, the tapered neck could be directed toward the end of the pocket as illustrated in the modification according to Figure 5, details of said latter modification being otherwise the same as in Figure 1. It should be, however, recognized that when the spout 14 is directed cornerwise as in the preferred embodiment of Figure 1, it is necessary to extend the ridge 18 and angled sides 19 and 20 of the spout on to the cylindrical surface of body 13 as illustrated at 21 in Figure 1, otherwise the opening from body 13 into its neck 14 will be considerably restricted by reason of said downwardly curving surface of the pocket 13 in this region. In the case of the modification according to Figure 5 such an extension of the walls of the spout is not necessary unless, of course, the spout 14 is located nearer to one side of the pocket 13 than centrally thereof as shown.

Although the storage pocket 13 may be formed in any desired shape or configuration, as for example a part of a sphere, the illustrated cylindrical shape with upstanding end walls 22 and 23 at right angles to the marginal portions 15 is to be preferred because of the greater strength and rigidity it affords the pocket against crushing and also the desirable ornamental effect achieved.

The tapered shape given the spout or neck 14, permits as discussed above, by selectively locating the perforated line 17 across neck 14, a selection of size of the exit opening, provided by bending back the pocket along said line 17, in accordance with the particle size of material stored in pocket 13. It should be apparent that the closer the scoring line 17 is located to pocket 13, the larger the opening that will be formed therein by said bending, and conversely, the farther down the scoring line is on said neck away from body 13, the smaller the formed opening will be. Thus the pocket can be conveniently and simply adapted as a shaker packet for either salt, pepper or other particulate material which it is desired to be dispensed by sprinkling rather than by pouring. Obviously, of course, if one so desired, the perforations 17 could be located close enough to body 13 to permit free flowing of the stored contents therefrom. In this event, the location for the scoring line 17 would be dictated by the speed desired for the flowing of the contents. Thus, for example, if the packet were being used to store a liquid, the selected location for the scoring would determine whether the liquid were to be discharged in a stream or by drops.

Such a packet may be conveniently and economically produced by a continuous process in relatively large numbers at low unit cost using an apparatus such as illustrated diagrammatically in Figure 6. Referring to said Figure 6, it is proposed that the packets be formed according to the present invention from two rolls of strip material by continuously feeding a strip 111 of heat softenable plastic film from a rotatably supported roll 211 through an oven or other heating means 125 wherein the plastic film is heated to a desired softening point, the film continuing over a continuously driven rotating drum 126 having a plurality of female die portions 127 spaced about its periphery in rows, aligned portions of the softened plastic strip 111 being caused to take the shape of said mold depressions 127 by the application of fluid pressure from means 128 or by using a vacuum which will suck the softened plastic into the mold depressions 127. Conceivably the drawing could be performed by other means such as through the combined action of male and female dies. Both the vacuum sucking and fluid pressure techniques as well as the use of male and female dies are well known in the art and for the purposes of the present description, it is believed, need not be more specifically described. The mold depressions 127 will of course, be initially given the shape of the depressed area 12 to be formed in member 11 of the packets including the cylindrically shaped pocket 13 and tapered communicating neck or spout 14.

The depressions 12 thus formed in the strip of plastic film 111 serve to hold the strip in place on the drum as it is rotated. As each depression is brought up to the horizontal position indicated at 129, they are filled with salt, pepper or other particulate material by volumetric filling device 130.

As drum 126 continues to rotate, the filled depressions 12 are brought into alignment beneath strip 116 of backing material fed off roll 216, the two strips being brought together and fed beneath means such as pressure belt 131 by which heat and pressure are applied to seal the two strips in joined relation. For this purpose the contacting side of strip 116 is coated with a lacquer or other material which will bond to the plastic film 111 under the application of heat and pressure as the adjacent portions of the two films are pressed in to contact between the drum 126 and belt 131. Thereafter the joined strips leave the drum and are passed through cutting dies 132 where sections containing a filled pocket with a surrounding sealed margin are cut out from the joined strips and simultaneously the scoring indentation provided in the plastic film across the neck 14 of the pockets 12 at the desired location, the packets 10, thus formed, dropping from the joined strips 111 and 116 into a container or conveying means 133.

Although as previously discussed, the plastic film 111 may be any of several known heat softenable plastic materials, polystyrene is to be preferred not only because it is relatively inexpensive but also because when used in a thickness between .003 to .005 inch it will keep the shape to which it is formed by means 128 even though it also retains its inherently flexible character. It also possesses a very low moisture transmission rate. Sheet stock 116 is preferably a 70# C2S litho paper although a wide variety of other materials might be utilized as previously discussed. Preferably also the paper is lacquered with a heat seal coating such as pyroxseal 26–79–1 which when activated by heat and pressed against the polystyrene film strip 111 will provide the required seal. Any other convenient means of effectively bonding the two sheets together, however, may be employed.

Although I prefer to use a transparent plastic for member 11 of my packets so that the contents stored in pocket 12 will be readily visible as well as any advertising legend or other information printed on the backing member 16, the backing layer 16 instead may be transparent. Likewise either or both layers of the packet may be transparent, translucent or opaque according to the particular requirements or desires of the manufacturer or user.

Conceivably the rigidity of the pocket 13, might be increased by forming ribs extending lengthwise or laterally thereof or by forming a design therein simultaneously with the drawing thereof into the molding depressions 127 by suitably shaping the surface of said depressions 127.

It will furthermore be recognized that although the description of the invention thus far has been predicated on an assumption that each packet 10 would contain a single pocket 12, it should be apparent that it would be possible to cut packets from the joined strips 111 and 116 so that each packet thus formed would contain a pair of depressions located either lengthwise of each other or side by side, one being filled with pepper, for example, and the other with salt. Preferably, for greatest convenience in using, the two spouts should not extend in the same direction. Thus if a dual-pocket packet were to be formed having pockets according to Figure 1 their spouts would preferably be directed in one case to the left hand and in the other case to the right hand corner. If the pockets were formed according to the arrangement shown in Figure 5, most satisfactory results would be obtained if the spout were faced in opposite directions. Obviously also the perforations or scoring lines 17 would be selectively located in accordance with whether the pocket contained pepper or salt so as to prevent discharge of their contents except by shaking.

Thus it has been demonstrated that all of the objects as well as the described advantages and other features of the invention can be obtained in a convenient simple and practical manner.

Having described my invention, I claim:

1. A shaker packet of particulate material embodying a first sheet of transparent plastic, the central area of which has been depressed to provide a pocket containing particulate material and having a tapered dispensing neck of generally triangular shaped cross-section communicating therewith, the cross-section of said neck progressively decreasing in size in a direction away from said pocket, the surrounding marginal area of said first sheet being substantially flat, a second sheet covering over said depressed area of the first sheet and secured to the surrounding marginal portions thereof to seal the particulate material in said pocket and said first sheet being scored transversely across the tapered dispensing neck and on either side thereof to permit breaking of said sheet along said scoring by folding back the packet, the size of the opening thus formed in the neck being of a size through which the stored particulate material will not readily flow but may be dispensed therethrough by shaking the packet.

2. A shaker packet as claimed in claim 1 wherein the pocket containing particulate material has the shape of a partial cylinder with substantially straight-sided ends.

3. A shaker packet as claimed in claim 1 wherein the pocket has rigidifying means impressed therein.

4. A packet comprising a first sheet-like member having a pocket spaced inwardly of its surrounding essentially flat marginal portions which embodies a relatively large storage body and a smaller tapering neck communicating therewith, said neck being characterized by a ridge extending lengthwise thereof from adjacent the storage body and opposed sides sloping therefrom to the adjacent flat marginal portion of said first sheet-like member, said neck further progressively decreasing in cross sectional size in a direction away from the storage body, and a backer member superposed on said first member and sealed to the marginal portions of said first member about its said pocket to enclose said storage body and communicating neck.

5. A packet according to claim 4 wherein one of said members is scored transversely of said neck of said pocket to permit opening of the packet by folding back along said scoring and to permit dispensing from the storage body through said neck.

6. A packet for particulate material embodying a first sheet of transparent plastic, the central area of which has been depressed to provide a pocket for containing particulate material and a neck which opens at one end into said pocket and converges therefrom to a closed end, a second sheet covering said pocket and neck constituting the depressed area of the first sheet and having marginal portions secured to the surrounding marginal portions of said first sheet for sealing particulate material within said depressed area, the cross-section of said converging neck having a depth and width at the end where it opens into the pocket which is sufficiently large to permit free flow of the particulate material into the neck, the depth and width of said neck gradually and progressively decreasing along substantially its entire length to a restricted cross-section at its closed end through which the particulate material cannot flow, and a line of perforations impressed in one of said sheets on either side of said neck and which extends across said neck at a predetermined location intermediate the ends of said neck, said perforations providing a line along which the packet may be broken to open an exit in said neck defined by the cross section thereof for dispensing the particulate material, and the location of said perforations being determined by the size of the particulate material and the rate at which the particulate material is to be dispensed through the opened exit.

7. A packet comprising, in combination, a first sheet-like member having a depressed area spaced inwardly of its marginal portions which embodies a relatively large body having a dispensing neck communicating with said body at one end where it has a height approximating that of the body, said neck tapering outwardly therefrom so as to have a cross-section gradually and progressively decreasing both in height and width along its entire length from said end of maximum cross-section where it communicates with the body to approximately a point adjacent its outer end, and a backer member covering said depressed area and sealed to the marginal portions of said first member about the depressed area.

8. A packet comprising a first sheet-like member having a pocket-like portion spaced inwardly from its edges including a storage area and a dispensing neck which communicates therewith at one end, said neck having a maximum cross-section including a height approximately that of the storage area at its end where it communicates with said storage area, the cross-section of said neck gradually and progressively decreasing in both height and width along its entire length from said end to a minimum cross-section at its other end away from the storage are of said pocket-like portion, a backer member of sheet-like material overlying said pocket-like member and having marginal portions sealed to the surrounding marginal portions of the first member, and said first member being scored across said dispensing neck, said packet being openable by folding back the packet from said scoring.

9. A packet comprising a first sheet-like member having a pocket-like portion spaced inwardly from its edges including a storage area and a dispensing neck of generally pyramidal shape and directed toward one corner of the packet, the cross-section of which neck progressively decreases in size from a height approximating that of the storage area where it communicates therewith to a minimum cross-section at its end away from the storage area of said pocket-like portion, a backer member of a sheet-like material overlying said pocket-like member and having marginal portions sealed to the surrounding marginal portions of the first member, and said first member being scored across said dispensing neck, said packet being operable by folding back the packet from said scoring.

References Cited in the file of this patent
UNITED STATES PATENTS

| | | |
|---|---|---|
| 2,277,050 | Reed et al. | Mar. 24, 1942 |
| 2,420,983 | Salfisberg | May 20, 1947 |
| 2,513,852 | Donofrio | July 4, 1950 |
| 2,530,306 | Land | Nov. 14, 1950 |
| 2,546,059 | Cloud | Mar. 20, 1951 |
| 2,550,132 | Woods | Apr. 24, 1951 |
| 2,705,579 | Mason | Apr. 5, 1955 |
| 2,707,581 | Kaplan et al. | May 3, 1955 |
| 2,745,751 | Pichardo | May 15, 1956 |

UNITED STATES PATENT OFFICE
CERTIFICATION OF CORRECTION

Patent No. 2,956,710                  October 18, 1960

Donal J. O'Connor

It is hereby certified that error appears in the above numbered patent requiring correction and that the said Letters Patent should read as corrected below.

Column 7, line 20, for "are" read -- area --; column 8, line 13, for "operable" read -- openable --.

Signed and sealed this 25th day of April 1961.

(SEAL)
Attest:
ERNEST W. SWIDER
Attesting Officer

DAVID L. LADD
Commissioner of Patents